United States Patent [19]
Serrill

[11] 3,890,735
[45] June 24, 1975

[54] MECHANISM FOR FISHING LURE

[76] Inventor: Dehart M. Serrill, 1745 No. Main, Kansas City, Mo. 64116

[22] Filed: Aug. 20, 1973

[21] Appl. No.: 389,570

[52] U.S. Cl. .................. 43/36; 43/37; 43/42.24; 43/42.41
[51] Int. Cl. .................. A01k 83/02; A01k 85/02
[58] Field of Search .......... 43/37, 36, 42.41, 42.04, 43/43.4, 44.2, 42.4, 43.2, 44.82, 53.5, 35

[56] References Cited
UNITED STATES PATENTS

| | | | |
|---|---|---|---|
| 783,253 | 2/1905 | Flegel | 43/36 |
| 994,927 | 6/1911 | Jefferson | 43/42.41 |
| 1,152,698 | 9/1915 | Bonner | 43/43.4 |
| 1,672,498 | 6/1928 | Otto | 43/37 |
| 2,247,806 | 7/1941 | Foley | 43/37 |
| 2,851,817 | 9/1958 | Faustich, Jr. | 43/44.82 |
| 3,100,359 | 8/1963 | Laba | 43/37 |

Primary Examiner—Warner H. Camp
Attorney, Agent, or Firm—Lowe, Kokjer, Kircher, Wharton & Bowman

[57] ABSTRACT

A mechanism to be embedded in a fishing lure comprises an elongated, tubular housing having three peripherally spaced openings in the sidewall. Three elongated spear-like members extend into the tube through the respective openings and the inner ends of the members are fastened to an elongated rod telescoped into the tube from the open end of the latter. Cam surfaces on the edges of the openings guide the members into projected, fish catching positions when a sharp pull on the rod by a fishing line slides the rod relative to the tube and forces the members outwardly through the tube openings. The tube end wall and a cross pin through the tube limit the sliding of the members between the retracted and projected positions.

7 Claims, 6 Drawing Figures

PATENTED JUN 24 1975 3,890,735
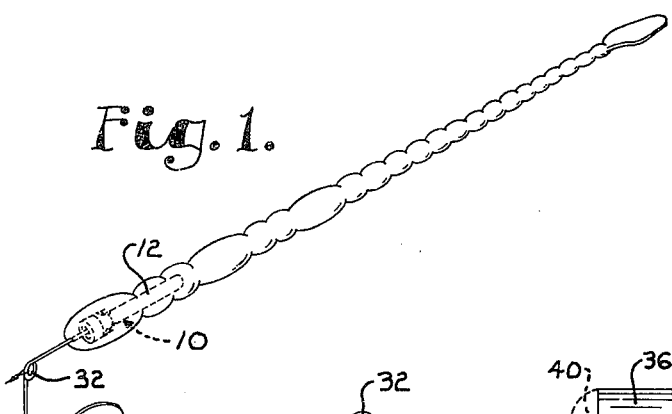
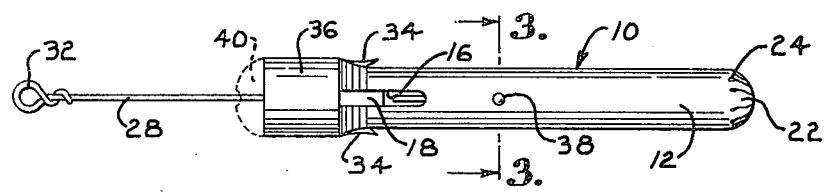
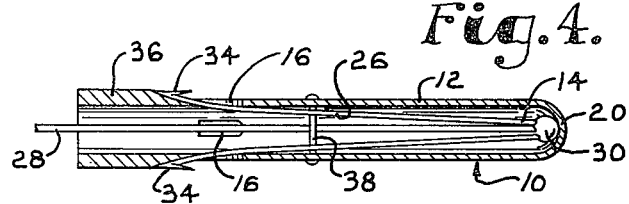
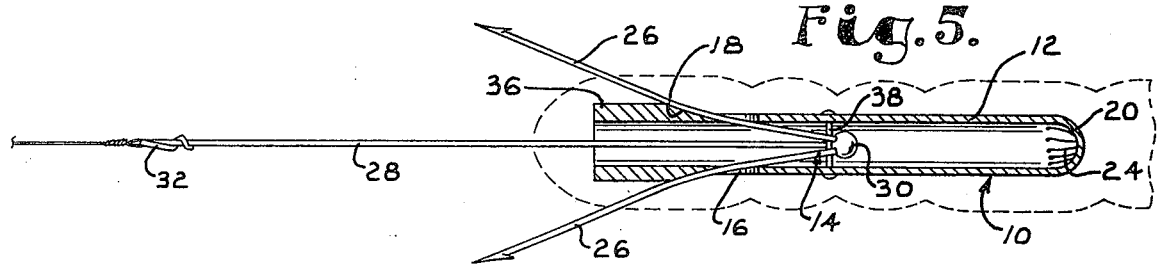
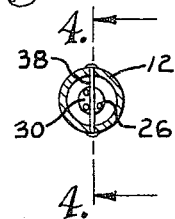
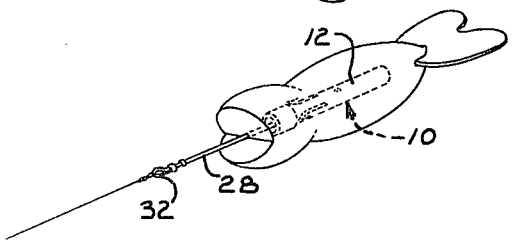

MECHANISM FOR FISHING LURE

This invention relates to fishing equipment, and more particularly to a mechanism providing the hooking function for fishing lures. The invention presents a mechanism wherein the hooks are initially retracted but move to their extended, fish catching positions in response to a sharp pull on the fishing line.

A variety of devices have heretofore been suggested for maintaining fishhooks within a lure body until a fish strikes the lure. These have included spring loaded and lever mechanisms for pivoting or otherwise swinging the hooks into extended positions. A common fault of these devices is that the nature of the movement of the hooks from their guarded to their extended positions is of a type to unduly frighten the fish from the lure before the hooks are in positions for impaling the fish.

One of the important objects of the present invention is to provide a retractable fish hook mechanism which does not give the fish prior warning of its activation.

Another important object of the invention is to provide such a mechanism which is simple and therefore economical to fabricate and which is constructed to permit relatively easy replacement of the hook elements.

Still a further important object of this invention is to provide a device having the foregoing characteristics yet which may be completely contained within a lure body rendering the lure totally weedless and more natural appearing to a fish.

These and other objects of this invention will be further explained or will be apparent from the description, claims and drawing.

In the drawing

FIG. 1 is a perspective view on a reduced scale showing one form of fishing lure with a mechanism embodying the principles of the invention appearing in phantom.

FIG. 2 is a side elevational view of the mechanism, parts being broken away for clarity.

FIG. 3 is a cross-sectional view taken along line 3—3 of FIG. 2.

FIG. 4 is a fragmentary, cross-sectional view taken along line 4—4 of FIG. 3.

FIG. 5 is a view similar to FIG. 4 but showing the hook members in their projected positions.

FIG. 6 is a view similar to FIG. 1 but illustrating the mechanism in use with a different type of lure.

A catching mechanism embodying the principles of this invention is broadly designated by the numeral 10 and includes an elongated, rigid tubular housing 12 and a hook element broadly designated 14. Housing 12 is provided with a plurality of peripherally spaced apart, elongated openings 16 and the leading edge of each opening 16 has an inclined edge 18 (FIG. 2) providing a cam surface for a purpose to be explained hereinafter.

The trailing end of housing 12 is closed with an end wall 20. In the embodiment chosen for illustration end wall 20 is formed by the inward bending of a plurality of segments 22 integral with tube or housing 12 and separated by a plurality of slits 24 in the housing. Housing 12 may be constructed from copper, brass, stainless steel or other bendable material and the illustrated construction for end wall 20 permits the tube to be closed after hook element 14 is installed in the tube. Further, the end wall may be opened to permit removal and replacement of the element should that become necessary.

Hook element 14 comprises a plurality of elongated, relatively rigid hook members 26, there being three members for the element shown in the drawings. One end of each element 26 is rigidly secured by a weldment 30 (solder or other fastening means) to the proximal end of an elongated, rigid rod 28 extending in telescoped relationship into the open end of housing 12. Manifestly, since each element 26 is secured at its end to weldment 30, a limited degree of movement in any direction is possible. The end of rod 28 outside the housing terminates in an eye 32 to which the fishing line may be tied.

The other end of each member 26 is provided with a pointed barb 34 and the lengths of the members are such that each pointed end rests on the corresponding cam surface 18 and the weldment 30 is against end wall 20 when the hook element is in its fully retracted position. The element is slidably received within the housing and a sharp pull on the fishing line will move the element forwardly in the housing. Such forward movement of the element results in a camming of the hook members to their extended positions as illustrated In FIG. 5. To this end it should be pointed out that the members are preferably formed of substantially rigid yet somewhat springy material such as spring steel to permit such distortion of the members as may be required in movement between the retracted and projected positions. Further, the spring bias permits a desired amount of "preloading" of the mechanism to insure that the members remain in the retracted positions until the fisherman activates the mechanism by a sharp pull on the line following a strike. The members are, however, sufficiently rigid to withstand the forces imparted by a hooked fish.

Preferably the open end of housing 12 is of increased wall thickness presenting an enlargement or collar 36 immediately adjacent the openings 16. This permits the forming of relatively long, smooth cam surfaces 18 at the edge of the collar and also provides substantial strength for the mechanism. A stop to limit the forward movement of hook element 14 may take the form of a pin 38 extending transversely of housing 12. Pin 38 is received between members 26 on the opposite side of weldment 30 from end wall 20 thus limiting the movement of the weldment to back and forth movement between the pin and the end wall.

In operation mechanism 10 is disposed in the body of a fishing lure. Desirably the mechanism may be molded or otherwise installed in the body of soft bodied lures such as plastic worms, plastic frogs or the like. Rod 28 is pushed to move weldment 30 to the rear of the housing and this brings the barb ends of members 26 to the positions best shown in FIG. 4. The fishing line is tied to the rod at eye 32 and the lure is fished in the conventional manner. The retracted position for the hook members renders the lure entirely weedless and the spring bias of the members insures that the mechanism remains in the retracted position until the fisherman gives a pull on the line sharp enough to overcome the friction of the hook element against the housing.

It should also be pointed out that the mechanism of this invention maintains the barbed ends of the hook members entirely within the soft lure body until the fisherman sets the hooks. Thus, a striking fish is not forewarned of the hooks because it feels only the soft lure body and does not feel the hooks until they move out through the lure body and impale the fish.

The sharp pull on rod 28 when the lure is in the fish's mouth slides the element forward. Members 26 are cammed outwardly at an angle as shown in FIG. 5 and, of course, the pointed barbed ends move through the material of the lure body and into the flesh of the fish, impaling the latter. The inertia of the relatively heavy housing 12 compared to the relatively light hook element 14 causes relative movement between the housing and element responsive to a sharp pull without noticeably pulling the lure. This helps minimize the chance that the fish will be frightened away before it is impaled by the advancing hook members.

It will, of course, be apparent to those skilled in the art that the mechanism of this invention may be used advantageously with a variety of different types of lures. Also, many different methods may be employed to install the mechanism in the different lures. It is contemplated that the mechanism may be fitted with additional weight if desired or required for particular fishing operations. A weight 40 has been shown in phantom in FIG. 2 affixed to the leading end of housing 12 to illustrate one means for weighting a lure.

A further particular advantage of my fishing lure mechanism over prior art devices is that hook element 14 can be reinserted in housing 12 after it has been actuated in either a successful or unsuccessful effort to catch a fish. Also, if the lure in which the mechanism is inserted becomes torn or otherwise unsuitable for use, it may be removed and inserted into a new lure. Thus, the cost of the mechanism may be spread over the life of a number of lures making it particularly economical.

Having thus described my invention, what I claim as new and desire to secure by Letters Patent is:

1. In a fishing lure comprising an elongated worm body of homogeneous soft plastic material, the improvement comprising:
    an elongated tubular housing disposed in said worm body and surrounded by said plastic material,
    said housing having at least three equally spaced peripheral openings in the sidewall thereof;
    a rigid enlarged portion extending around said housing adjacent said openings and having an upwardly inclined edge presenting a cam surface extending to each of said openings;
    at least three elongated spring steel members normally disposed in retracted positions in said housing and adapted to move through said openings to extended fish-catching positions projecting from said worm body and in frictional engagement with said cam surface,
    each of said members having an end disposed on said cam surface in said retracted positions and characterized by a degree of spring bias against said cam surface to hold said members in said retracted positions,
    each of said members being further characterized by a line of curvature at the point of frictional contact between the member and said cam surface when the member is in its extended position whereby to project from said housing at an angle greater than the angle of inclination of the member in its retracted position within the housing; and
    attaching means coupled with the end of each of said members which is distal to said cam surface,
    said attaching means accommodating limited movement of the members in any direction and being adapted to be secured to a fishing line whereby a sharp pull on the line slides said members through their respective openings and said cam surface guides said members through said worm body to their fish-catching positions.

2. The invention of claim 1, wherein is included stop means coupled with said housing and engageable by the members upon predetermined relative movement between the members and the housing for stopping said members in said extended positions.

3. The invention of claim 1, wherein is provided limiting means on the housing and engageable by the members for limiting movement of the members into the housing when said members are moved to their retracted positions.

4. The invention of claim 3, wherein said limiting means comprises an end wall engageable by said members closing one end of the housing.

5. The invention of claim 4, wherein said attaching means includes an elongated, relatively rigid rod telescoped into the housing, one end of the rod being coupled with said distal ends of said members, the other end of the rod projecting outwardly from the housing when the members are in said extended positions.

6. The invention of claim 5, wherein is included stop means coupled with the housing and engageable by the members for stopping the latter in said extended positions, said stop means including a pin projecting transversely across the housing and in the path of movement of said attaching means.

7. The invention of claim 1 wherein said end of each member disposed on said cam surface is provided with a pointed barb.

* * * * *